W. P. BOVARD.
CLAMPING MECHANISM.
APPLICATION FILED DEC. 15, 1916.

1,296,470.

Patented Mar. 4, 1919.
4 SHEETS—SHEET 1.

Witnesses
Harry Wilkinson
Otis Miller

Inventor
WILLIAM P. BOVARD

By

Attorney

W. P. BOVARD.
CLAMPING MECHANISM.
APPLICATION FILED DEC. 15, 1916.

1,296,470.

Patented Mar. 4, 1919.
4 SHEETS—SHEET 2.

Inventor
WILLIAM P. BOVARD

Witnesses
Harry Wilkinson
Otis Miller

By

Attorney

W. P. BOVARD.
CLAMPING MECHANISM.
APPLICATION FILED DEC. 15, 1916.

1,296,470.

Patented Mar. 4, 1919.
4 SHEETS—SHEET 3.

Inventor
WILLIAM P. BOVARD

Witnesses
Harry Wilkinson
Otis Miller

By

Attorney

UNITED STATES PATENT OFFICE.

WILLIAM P. BOVARD, OF MANSFIELD, OHIO, ASSIGNOR TO THE OHIO BRASS COMPANY, OF MANSFIELD, OHIO, A CORPORATION OF NEW JERSEY.

CLAMPING MECHANISM.

1,296,470.  Specification of Letters Patent.  Patented Mar. 4, 1919.

Application filed December 15, 1916. Serial No. 137,164.

*To all whom it may concern:*

Be it known that I, WILLIAM P. BOVARD, a citizen of the United States, residing at Mansfield, in the county of Richland and State of Ohio, have invented certain new and useful Improvements in Clamping Mechanisms, of which the following is a specification.

My invention relates to a mechanism capable of gripping a steel rail, girder or other similar article for the purpose of supporting thereby in relation to the rail, girder, etc., a drilling machine, a reamer, rail bonding apparatus or any device to be attached to the rail, etc., and held in relation thereto.

My invention is particularly adapted to be used with rails for supporting thereto various devices as by its use it is not necessary to support the device by means which overhang the head of the rail as is usual in most devices which attach to the rail. The invention is one which can be quickly detached and both operations involve very little effort on the part of the operator. My improved clamping mechanism is so constructed that its gripping or holding members engage the inner faces of the flanges on a rail, I beam, channel iron, etc., and there are no parts which hold onto the rail member in any other manner, therefore my improved gripping mechanism is of the greatest value when used in connection with rails over which trains are constantly passing as there is no interference offered to traffic.

I have shown in one figure a drill supported to a rail by means of my invention but my device is not limited to supporting drilling machines only but can be used for attaching any other machine, device or article as may be required and for which it is suited. The machines with which it is used may be an integral part of my invention or they may be a separable part attached thereto by any well known means.

These and other new and useful objects as will appear later are secured and attained by the novel construction, combination and arrangement of parts of which my invention is composed and which will appear later as more fully described and claimed and shown in the accompanying drawings in which:

Figure 7:
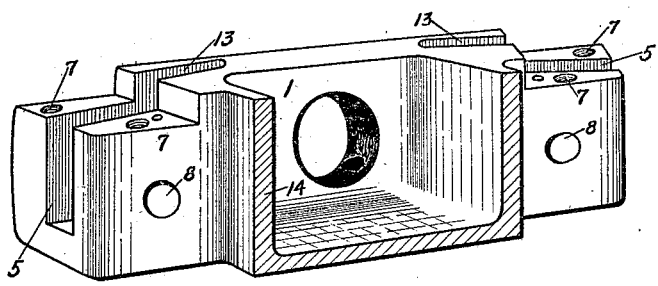
Fig. 7 shows a perspective view of the main supporting member of my invention.
Figure 8:
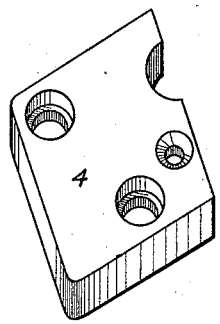
Fig. 8 shows a perspective view of a cap member of my invention for holding the wedge member in place.
Figure 9:
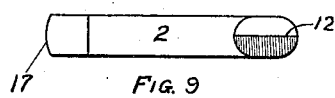
Figs. 9, 10 and 11 are views from different points of one form of my wedge member.
Figure 10:
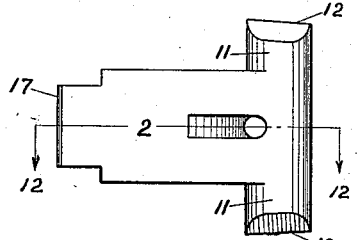
Figure 11:
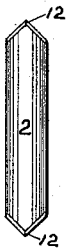
Figure 12:
Fig. 12 is a sectional view of the wedge member shown in Figs. 10, 11 and 9 and is taken on line 12—12 Fig. 10.
Figure 13:
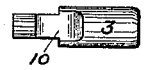
Figs. 13, 14 and 15 are various views of one form of releasing pin which I use.
Figure 15:
Figure 14:
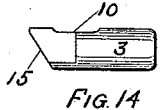
Figure 16:
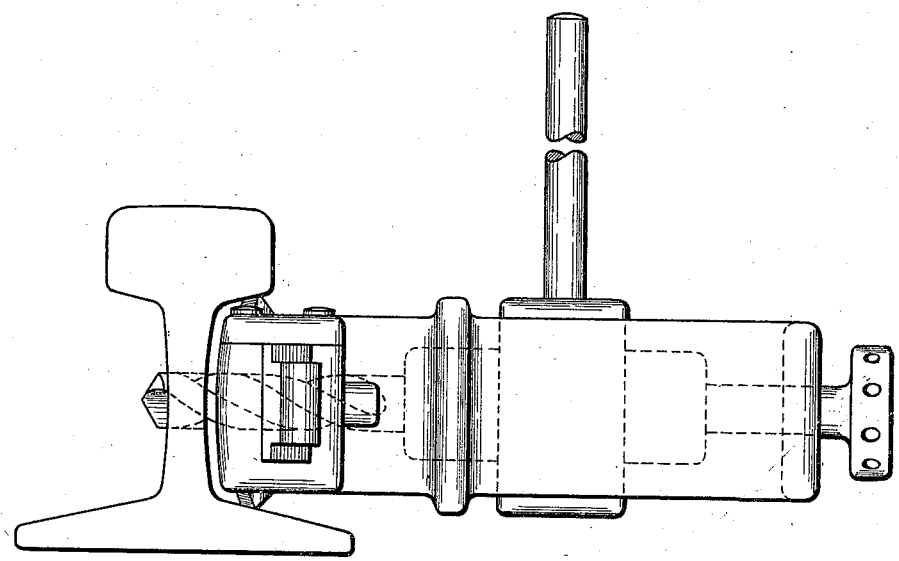
Fig. 16 is an end elevation view of my invention in combination with a rail and a drilling machine but nothing is claimed as to the construction of the drilling machine.

Referring to the construction as disclosed by the drawings, numeral 1 represents a body member best shown in Fig. 7, numeral 2 represents a wedge member shown clearly in Figs. 9, 10, 11 and 12, and numeral 3 represents a releasing pin better shown in Figs. 13, 14 and 15. Numeral 4 represents a cover for retaining the wedge 2 in position in the body.

The body 1 is provided with a seat 5 at each end in which slides the wedge 2 and is retained in place by the cover 4 and which is held in place by means of screws 6 entering threaded holes 7.

The body member 1 is provided with holes 8 in which slides the releasing pin 3 and held from being removed by the screw 9 which engages a cutaway portion 10 of releasing pin 3.

The wedge 2 is provided with extension parts 11 terminating in a chisel edge 12, the extension 11 fitting in slots 13 of body 1 and which have a greater width than that of the wedge part 11 (see Fig. 4), thereby allowing freedom of movement of the wedge 2 with respect to the body 1 in a longitudinal direction or approximately so.

Figure 4:
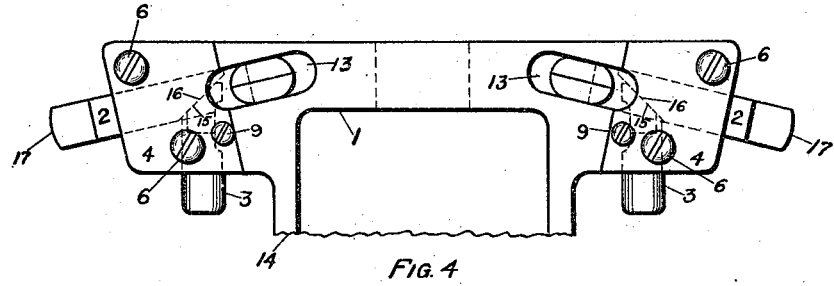
Fig. 4 shows a top plan view of my device not attached to any supporting means nor supporting any device itself.
Figure 5:
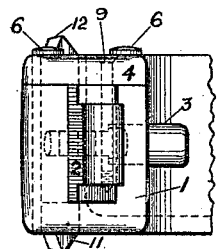
Fig. 5 shows an end elevation view of my invention only.
Figure 6:
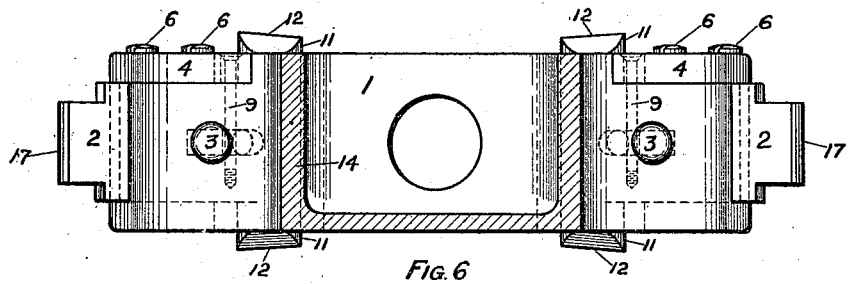
Fig. 6 shows an elevation view of my invention not attached to a support.

The releasing pin 3 is provided with a beveled face 15 at one end which engages with a beveled face 16 on the wedge 2 and the assembled relation of these two parts and faces is shown in Fig. 4. The pin 3 is slidable toward and away from the wedge. The body 1 is provided with an extension 14 which may be variously shaped and constructed to meet requirements and is intended for the attachment of a machine such as a drill, bonding device, etc., and can form either an integral union between my holding mechanism and a machine or it can be arranged for attaching to such a machine, thereby making it possible to use one holding device with various machines.

Figure 1:
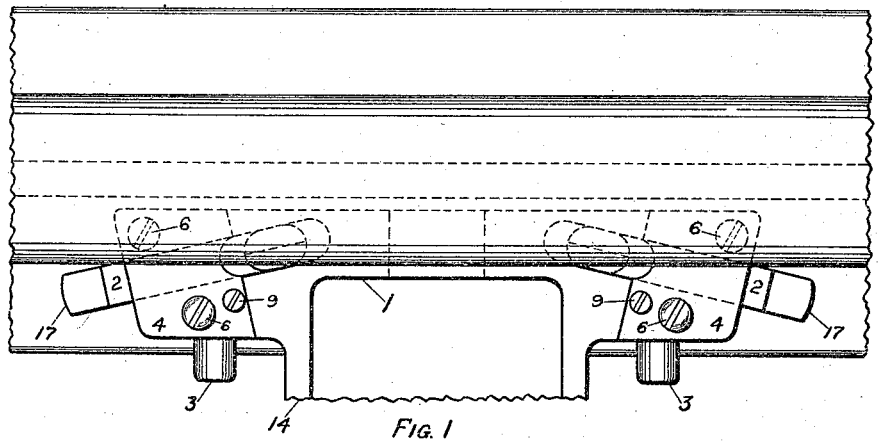
Figure 1 is a top plan view of my device in combination with a rail but not showing any means supported thereby.
Figure 2:
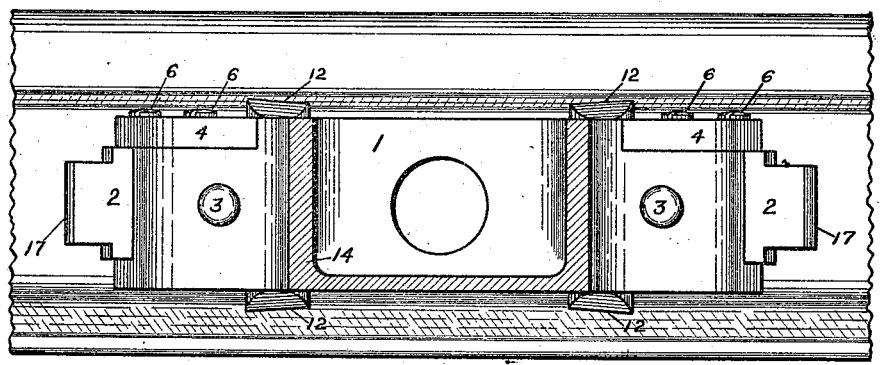
Fig. 2 is a front elevation view of my device attached between and to the flanges of a rail.
Figure 3:
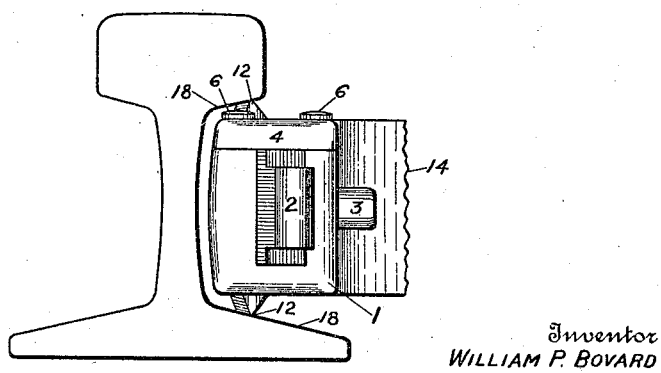
Fig. 3 is an end elevation view of my device in combination with a rail.

The operation of my invention is as follows; the wedges 2 are pulled out or away from each other as far as possible and the body with its attachments is then placed in position up against the rail as shown in Figs. 1, 2 and 3. With a light hammer the operator drives in the extensions 17, thereby forcing the wedges 2 obliquely toward each other and toward the longitudinal axis of the support and causing their cutting edges 12 to be forced into the faces of the rail flanges 18.

I have found by actual experience that while the distance that the edges 12 cut into the surfaces 18 is not more than $\frac{1}{32}$ of an inch or slightly more, still my improved attaching device will require many hundred pounds pull to remove it from the rail.

To remove my device from the rail after installation, I provide the pins 3 already described and it is only necessary to tap the outer ends of these pins with a light hammer and the wedges will be forced outward or away from each other due to the wedging force set up between the faces 15 and 16 (Fig. 4).

I have found my invention of particular value in drilling holes for bond terminals in rails where it requires a true and smooth hole and which can be secured only by having the drill bit held preferably rigid with respect to the rail and where my device is used the drill will be held absolutely rigid during its operation.

I have found by actual experience that my device can be simplified by arranging to use only one wedge member and without departing from the novelty herein disclosed.

My device is also of particular advantage for supporting apparatus and in electrically applying bonding when interruption to the process by traffic is not only annoying but detrimental to successful results. In the construction of my invention I have found the best results to be secured when it is intended to adapt the device to rails having beveled faces such as 18 (Fig. 3) to make the chisel edge of the wedges and the direction of the movement of the wedges in the body 1 such that when the device is placed against the rail and the wedges pushed inward by hand that the edges 12 of the wedges will make contact with the faces 18 for approximately the full length of the edges 12. With this arrangement of parts as the wedge is driven farther toward the center it will cut farther into the face 18. This device differs in principle and construction from others in which the wedges operate away from each other and toward the surfaces to which they are to attach and I am making no claim for such construction.

I have fully described my improved holding device embodied in my invention and illustrated same by drawings and as my invention is subject to many changes and alterations by one skilled in the art, I do not wish to be restricted to the exact construction shown and described except as required by the scope of the amended claims and what I claim as new and which I desire to secure by Letters Patent is:

1. The method of forming an attachment to a support provided with a flange or flanges consisting in first positioning in juxtaposition to one side only of the support a holding device provided with a slidable gripping member or members to engage the surface of the flange or flanges, then moving the gripping member or members obliquely toward the support along the surface of the flange or flanges and simultaneously forcing the gripping member or members into constantly increasing engagement with the surface of the flange or flanges to embed the gripping member or members into the surface of the flange or flanges.

2. The method of forming an attachment to a support provided with oppositely disposed flanges consisting in first positioning to one side only of the support a holding device provided with a movable one-piece wedge having oppositely disposed cutting edges, then sliding the wedge along the surface of the flanges combined with a constantly increasing pressure upon the faces of the flanges until the edges of the wedge are seated below the surface of the flanges to form a secure attachment.

3. The method of making attachment to track rails consisting in positioning on one side only of the rail and between the head and base flanges thereof a body member provided with a wedge member having engaging cutting edges moving toward the rail and engaging the opposing beveled faces of the head and base, then moving the wedge member toward the rail at an oblique angle thereto until the cutting edges of the wedge have sufficiently engaged the opposing beveled faces of the rail by means of the combination of a constantly increasing engaging pressure and a sliding movement over the beveled face of the head and base to embed the cutting edges into the beveled faces of the rail.

4. The combination of a holding mechanism and a track rail, the holding mechanism consisting of a body member positioned between the head and base of the rail on one side of the rail only, one or more wedge members slidably mounted in the body member to operate toward the web of the rail in an oblique direction thereto and engaging edges on the wedge members contacting with the engaging and oppositely beveled faces of the rail head and base on one side of the rail only when the wedge is obliquely moved as described.

5. A holding device for attachment to a track rail consisting in the combination of a body member, a one-piece wedge member slidably mounted in the body member to move toward the rail web and at an angle corresponding to a plane extending obliquely to the support and at right angles to the lower face of the rail base, and oppositely disposed engaging edges on the wedge member extending beyond the faces of the body member engaging the opposing beveled faces of the rail base and head on one side only of the rail to secure the device to the rail.

6. A holding device adapted for engagement to a support provided with flanges having oppositely disposed beveled faces comprising in combination, a body member, wedge members slidably mounted in the body member and oppositely disposed cutting edges combined with the wedge member to engage the beveled faces of the support flanges, the cutting edges being angularly disposed with respect to each other and each cutting edge approximately coinciding with the angle of the beveled face of the support at the line of engagement of the two, the wedge member and cutting edges being positioned and moving in a direction coinciding with a plane cutting both support flanges and extending obliquely to the support.

7. A holding device for attachment to a support provided with a flange or flanges comprising in combination a body member, one or more one-piece wedge members slidably mounted in the body member to engage the support flange or flanges, cutting edges on the engaging wedge member or members, the wedge member or members moving in a direction coinciding with a plane which is oblique to the support and cut through the flange or flanges of the support.

8. In a holding device, the combination of a body member, a one-piece wedge member slidably mounted at each end of the body member and having engaging edges extending beyond the faces of the body member, the wedge members being disposed in inclined planes with respect to each other and movable in a lateral direction toward and away from each other and toward and away from one edge of the body member.

9. In a holding device, the combination of a body member, a one-piece wedge member slidably mounted at each end of the body member and having engaging edges extending above and below the faces of the body member, the wedge members being disposed in inclined planes with respect to each other and movable in a lateral direction toward and away from each other and toward and away from the back edge of the body member, each of the wedges having a surface adapted to receive impact forces for moving it in its path and means engaging one side of each wedge for moving it away form the other.

10. A holding device comprising in combination a body member, non-extendible wedge members and oppositely disposed cutting edges on the wedge member or members, the wedges positioned in and moving only in the direction of planes angularly disposed to each other and the wedges engages the flanges of the rail on one side of the rail and securing the holding device thereto.

11. An article of manufacture comprising a body member, one or more diagonally placed slots therein, non-extendible clamping wedges positioned and secured in a slot or slots to engage the support and secure the article of manufacture thereto and means operated by impact to engage the wedges and release them from engagement with the support.

12. An article of manufacture comprising a body member, a drilling mechanism combined therewith and non-extendible wedge member or members adapted to engage the flanges of a rail at one side of the rail and securing the article of manufacture and the drilling mechanism in position on the rail.

In testimony whereof I affix my signature in the presence of two witnesses.

WILLIAM P. BOVARD.

Witnesses:
C. MARKS,
W. A. DARRAH.

Copies of this patent may be obtained for five cents each, by addressing the "Commissioner of Patents, Washington, D. C."